United States Patent
Huard et al.

(10) Patent No.: US 12,151,296 B2
(45) Date of Patent: Nov. 26, 2024

(54) METHOD FOR DRILLING A HOLE IN A PART MADE OF ELECTROCONDUCTIVE MATERIAL

(71) Applicant: SAFRAN AIRCRAFT ENGINES, Paris (FR)

(72) Inventors: Pierre Gaston Clement Huard, Moissy-Cramayel (FR); Antoine Van Doorn, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 692 days.

(21) Appl. No.: 17/310,521

(22) PCT Filed: Feb. 4, 2020

(86) PCT No.: PCT/FR2020/050175
§ 371 (c)(1),
(2) Date: Aug. 6, 2021

(87) PCT Pub. No.: WO2020/165522
PCT Pub. Date: Aug. 20, 2020

(65) Prior Publication Data
US 2022/0032385 A1   Feb. 3, 2022

(30) Foreign Application Priority Data
Feb. 12, 2019   (FR) ...................... 1901395

(51) Int. Cl.
*B23H 9/14*   (2006.01)
(52) U.S. Cl.
CPC ...................... *B23H 9/14* (2013.01)
(58) Field of Classification Search
CPC ........ B23H 9/14; B23H 9/10; B23H 2500/20; B23H 1/00
(Continued)

(56) References Cited

U.S. PATENT DOCUMENTS

| 6,127,642 A | * | 10/2000 | Gleason | B23H 7/265 219/69.15 |
| 6,140,600 A | * | 10/2000 | Kaneko | B23H 1/022 219/69.18 |

(Continued)

FOREIGN PATENT DOCUMENTS

| CN | 108340035 A | 7/2018 |
| CN | 108581108 A | 9/2018 |

(Continued)

OTHER PUBLICATIONS

Examination Report received for Indian Patent Application No. 202117038267, mailed on Feb. 2, 2023, 2 pages.

(Continued)

*Primary Examiner* — Eric S Stapleton
(74) *Attorney, Agent, or Firm* — WOMBLE BOND DICKINSON (US) LLP

(57) ABSTRACT

A method for electrical discharge drilling of a hole in a part made of electroconductive material, in particular for an aircraft turbomachine, the method using an electrical discharge machine including a head that can move relative to the part and has a consumable EDM electrode, which is of elongated shape and is translationally moved along its elongation axis, the method including the following steps: a) advancing the EDM electrode towards the part in order to drill a hole in the part; and b) retracting the EDM electrode and removing the EDM electrode from the hole, wherein it further includes the following steps: c) laterally moving the head; d) advancing the EDM electrode towards the part in order to scan for the part; e) computing the effective depth of the hole drilled in step a).

19 Claims, 2 Drawing Sheets

(58) Field of Classification Search
USPC .................................................... 219/69.17
See application file for complete search history.

(56) References Cited

U.S. PATENT DOCUMENTS

| | | | | |
|---|---|---|---|---|
| 2002/0148814 | A1* | 10/2002 | Ishiwata | ................ B23H 7/265 219/69.17 |
| 2008/0173618 | A1* | 7/2008 | Chen | ........................ B23H 7/20 219/69.17 |
| 2015/0273602 | A1* | 10/2015 | Mukai | .................... B23H 7/265 205/665 |

FOREIGN PATENT DOCUMENTS

| EP | 0616868 | A1 | 9/1994 |
|---|---|---|---|
| EP | 1184123 | A1 | 3/2002 |
| EP | 3290142 | A1 | 3/2018 |
| GB | 1569562 | A | 6/1980 |
| JP | 58-114821 | A | 7/1983 |
| JP | 5955207 | B2 | 7/2016 |
| RO | 126546 | B1 | 11/2014 |
| SU | 973269 | A1 | 11/1982 |
| WO | 2006/078096 | A1 | 7/2006 |

OTHER PUBLICATIONS

International Preliminary Report on Patentability received for PCT Patent Application No. PCT/FR2020/050175, mailed on Aug. 26, 2021, 12 pages (6 pages of English Translation and 6 pages of Original Document).
Search Report received for Russian Patent Application No. 2021125089, mailed on Jan. 26, 2023, 4 pages (2 pages of English Translation and 2 pages of Original Document).
International Search Report received for PCT Patent Application No. PCT/FR2020/050175, mailed on Jun. 9, 2020, 6 pages (2 pages of English Translation and 4 pages of Original Document).
Office Action received for Chinese Patent Application No. 202080017037.9, mailed on Apr. 14, 2023, 5 pages (2 pages of English Translation and 3 pages of Original Document).

* cited by examiner

[Fig.1]
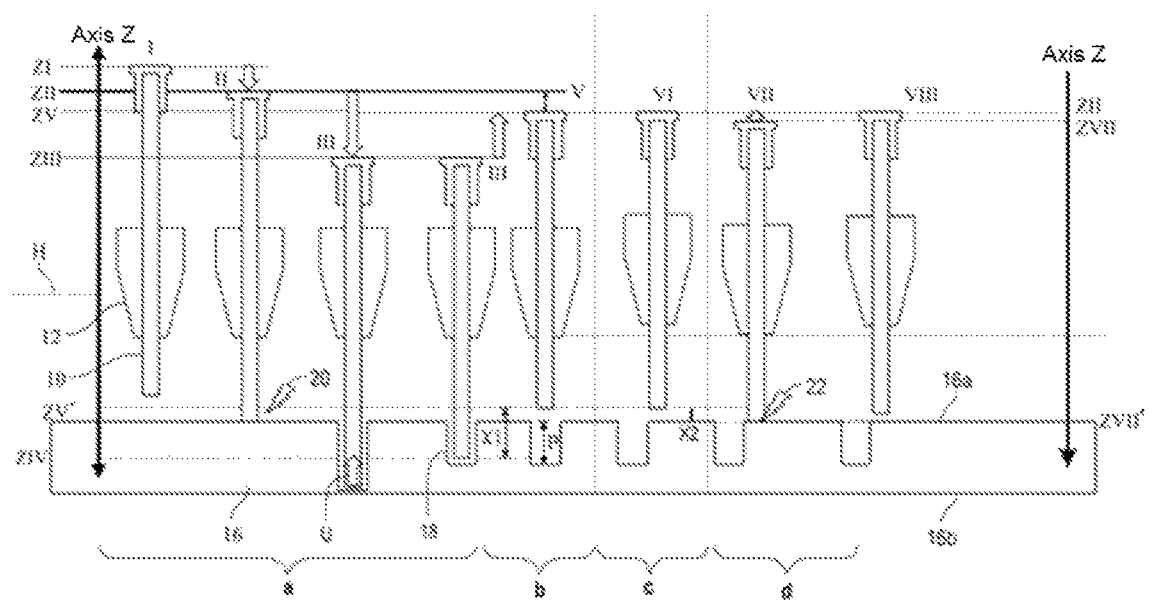

[Fig.2]
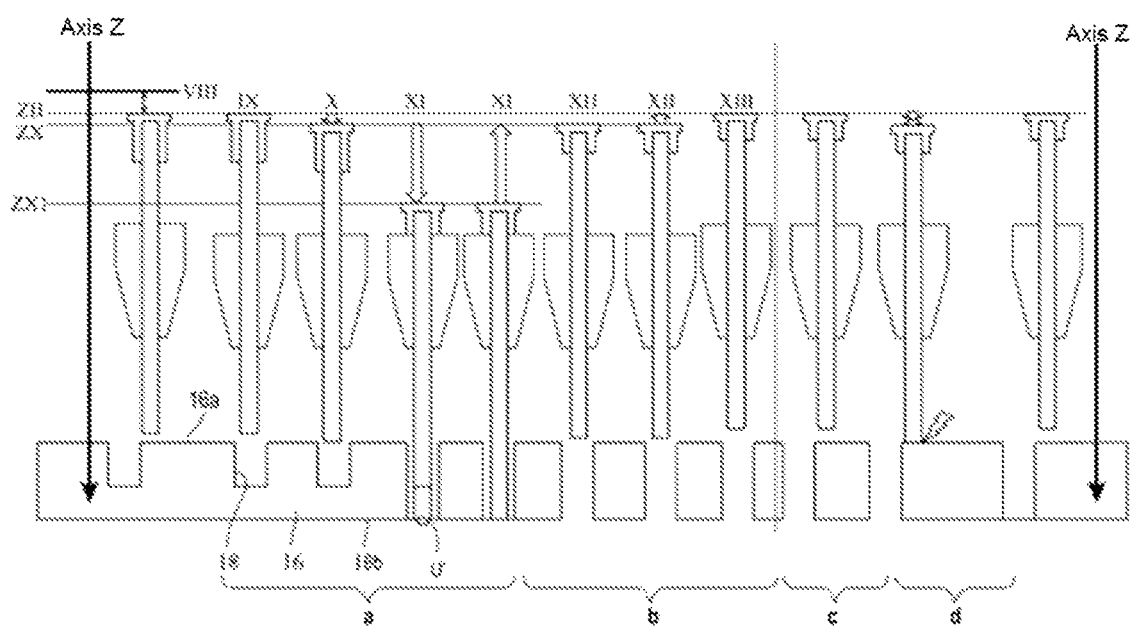

METHOD FOR DRILLING A HOLE IN A PART MADE OF ELECTROCONDUCTIVE MATERIAL

FIELD OF THE INVENTION

The present invention relates to a method for electrical discharge drilling of a hole in a part made of electroconductive material, in particular for an aircraft turbomachine.

TECHNICAL BACKGROUND

The prior art comprises, but is not limited to, the documents WO-A1-2006/078096, US-A1-2008/173618, JP-A-558114821 and US-A-6140600.

The electro discharge drilling or EDM drilling (Electro Discharge Machining) is a machining method that removes material from a part using electro discharges. It is also known as spark machining. This technique is characterised by its ability to machine all the electroconductive materials, regardless of their hardness.

The machining method consists of passing a current from an electrode to the part through a dielectric, in order to generate a "bubble" of vapour or vacuum that ionises and reabsorbs by imploding, which destroying the material of the part. This destruction (micro-implosion) causes the spark. The high current ionises a channel through the dielectric. A disruptive discharge then occurs between the electrode and the part, damaging the part very locally (some $\mu m^2$). This method allows holes to be drilled with great precision and is suitable for very hard materials or where the complexity of the workpiece requires it, as in the case of the parts of an aircraft turbomachine.

For example, the vanes of a turbine nozzle of an aircraft turbomachine comprise holes drilled by an EDM method. The vane is hollow and the holes pass through the wall of the vane to provide ventilation air passages between the internal cavity of the vane and the vein of the turbine.

The electrical discharge machine comprises a head that is movable relative to the part to be drilled and carries the EDM electrode. This electrode has an elongated shape and is intended to be moved in translation along its elongation axis. When the electrode is advanced towards the part, the spark is created and the destruction of the material of the part leads to the formation of a hole with a predefined diameter. The electrode is then retracted and removed from the hole in order to make further holes.

The electrode is a consumable in that it wears out during drilling. The wear of the electrode is characterised by a reduction in its length. One of the problems with EDM drilling is that it is difficult to accurately quantify this wear. When drilling a hole, the wear (reduction in length) of the electrode is generally greater than the depth of the hole drilled, but is not constant as it can vary from a hole to another.

This technical problem is combined with two contradictory objectives, which are to drill the part sufficiently to make a hole open out in one go (a single electrode advance), but not to advance the electrode too far so as not to risk impacting and drilling the wall opposite the hole, as is the case in the above-mentioned example of drilling a turbine vane wall.

A solution to this problem could be to control the opening of a hole by means of a pin which would be manually inserted by an operator into the hole. The pin would be of a predetermined diameter to check the diameter of the hole and would be driven into the hole to ensure that the pin does not hit a bottom of the hole if it is not opening out. In the event that a hole is not opening out, the operator would activate a rework step with the electrical discharge machine.

Another solution would be to use the EDM electrode as a pin. In this case, the electrode used to drill a hole would then be used to check that the hole is opening out. After the electrode has been retracted and removed from the hole (step b)), the electrode could again be advanced and inserted into the hole. If the hole is opening out, it could be advanced by a length greater than the theoretical depth of the hole. Otherwise, a bottom of the hole would be detected by scanning and a touch-up step would have to be activated. However, this solution would not be reliable. In fact, in practice, it would be difficult or even impossible to detect the bottom of the hole not opening out accurately by scanning because the scanning spark which should theoretically be created between the free end of the electrode and the bottom of the hole, would in practice be created between the electrode and the peripheral edge or the lateral wall of the hole, as soon as the electrode enters the hole.

Other solutions would be to check only the opening of the hole (without having the value of its diameter), by means of a thermal camera, by detecting light through the hole, by injecting liquid into the internal cavity of the vane in the above example, etc.

However, all these solutions are not entirely satisfactory as they are usually complex and time consuming to implement.

The present invention provides a simple, effective and economical solution to this problem.

SUMMARY OF THE INVENTION

The present invention provides a method for electrical discharge drilling of a hole in a part made of electroconductive material, in particular for an aircraft turbomachine, the method using an electro discharge machine comprising a head that can move relative to the part and carrying a consumable EDM electrode which is of elongated shape and which is moved in translation along its elongation axis, the method comprising the steps of:
a) advancing the EDM electrode towards the part in order to drill a hole in the part,
b) retracting the EDM electrode and removing the EDM electrode from the hole, characterised in that it further comprises following steps:
c) laterally moving the head over a distance representing less than 100% of the diameter of the hole to be drilled,
d) advancing the EDM electrode towards the part in order to scan the part, and
e) calculating the effective depth of the hole drilled in step a) from a difference in the measured sides in a direction parallel to said axis, between a first position of the EDM electrode at the end of step a), and a second position of the EDM electrode in step d) when scanning the part.

The method therefore proposes to determine the effective depth of a hole and thus to deduce whether the hole is opening out or not, via the electrical discharge machine and its EDM electrode. The electrode is used in two different ways. Firstly, it is used to drill the hole in step a). It is then used to scan the part, away from the hole. The disadvantage mentioned above with the detection of the bottom of a hole does not exist here because the scanning spark can appear without difficulty between the free end of the electrode and an external surface of the part.

In the present application, scanning is understood to mean electrical scanning or detection of an electroconductive part by an electrode. The scanning or detection of the part takes place when the electrode is close enough to the part that a spark is created between the electrode and the part. The strength of the spark must be chosen so as not to damage the part, as the purpose here is simply to detect the part in order to derive sides. The parameters of the electrical discharge machine will therefore be different depending on whether the electrode is used for a drilling function or a scanning function.

Furthermore, the method according to the invention makes it possible to propose a lateral displacement of the head in step c) over a short distance (less than 100% of the diameter of the hole to be drilled). This has several advantages, including a low risk of drilling an orifice or a component adjacent to the hole to be drilled, a saving of time on the electrode displacement strokes, an optimisation of the drilling time of the hole and generally an optimisation of the method as a whole.

The method according to the invention may comprise one or more of the following features or steps, considered alone or in combination with each other:
the method comprises additional steps of:
f) comparing the calculated actual depth with a theoretical depth, and
g) in case the actual depth is less than the theoretical depth, advancing the EDM electrode towards the part and into the hole drilled in step a) to drill it further;
step g) is performed so that the hole is opening out.
steps c), d) and e) are repeated after step g), and steps f) and g) are optionally repeated after step e);
a first side is determined equal to the distance traveled by the EDM electrode in said direction between its first position and a third position of the EDM electrode at the end of step b), and a second side is determined equal to the distance traveled by the EDM electrode in said direction between this third position and the second position of the EDM electrode, the effective depth of the drilled hole being equal to the difference between the first and second sides;
the displacement in step c) is performed over a distance of less than or equal to 5 mm, and preferably less than or equal to 1 mm;
the displacement in step c) is performed over a distance between 40 and 70% of the diameter of the hole to be drilled;
in step a), the EDM electrode is supplied with a voltage greater than or equal to 100V and a current greater than 1 ampere, and in step d), the EDM electrode is supplied with a voltage less than 100V and a current less than 1 ampere;
in step a), the EDM electrode is supplied with electrical pulses, the ratio of which, the time of the pulses to the time between the pulses is greater than 0.2, and preferably between 0.5 and 0.8, and in step d), the EDM electrode is supplied with electrical pulses, the aforesaid ratio of which is less than 0.2;
in step d), the polarity of the EDM electrode is reversed from the polarity of the EDM electrode in step a);
at the beginning of step a) and before drilling the hole, the EDM electrode is advanced towards the part to a predetermined distance suitable for creating a first spark;
this predetermined distance is between a free end of the EDM electrode and a surface of the part, preferably this predetermined distance is 10 mm;
in step d), the EDM electrode is moved towards the part to a predetermined distance suitable for creating a scanning spark;
in step d) the distance is between a free end of the EDM electrode and a surface of the part, preferably this predetermined distance is 5 mm.

BRIEF DESCRIPTION OF THE FIGURES

Further characteristics and advantages of the invention will become apparent from the following detailed description, for the understanding of which reference is made to the attached drawings in which:
FIG. 1 is a very schematic view of an EDM electrode and a part to be drilled, and shows several steps of a drilling method according to the invention, and
FIG. 2 is a view similar to FIG. 1 and showing further steps of the method.

DETAILED DESCRIPTION OF THE INVENTION

The present invention relates to a method for electrical discharge drilling or an EDM drilling using an electrical discharge machine, only an EDM electrode 10 and a head 12 for supporting that electrode being shown in the drawings.

The rest of the machine is not described or shown and is within the general knowledge of the person skilled in EDM drilling.

The head 12 is movable in a plane H as well as in a direction perpendicular to this plane (axis Z).

The electrode 10 has an elongated shape along an elongation axis parallel to the axis Z. In the example shown, the electrode 10 passes through a hole in the head and is slidable in that hole.

The electrode 10 is movable along the axis Z and can thus be advanced or retracted, an advance allowing, for example, to make the drilling of a hole 18, and a retracting allowing to exit this hole.

The part 16 to be drilled is positioned under the electrode 10 and the surface 16a on which the hole 18 is to be made may be positioned perpendicular to the axis Z if a hole normal to the surface is to be made, or at an angle to that axis X if a hole inclined with respect to the surface is to be made.

The part 16 is for example made of a nickel and cobalt based metal alloy. Alternatively, the part could be made of a composite electroconductive material such as CMC.

The electrical discharge machine is configured to use the electrode 10 in two distinct ways. This machine is for example that of the manufacturer Winbro Group Technologies, type HSD6.

The electrode 10 has a first function of electrical discharge drilling. The holes 18 to be drilled have, for example, a diameter of between 0.2 and 2 mm. They are preferably opening out. In the case where the holes 18 are oriented perpendicularly to the surface 16a of the part, the theoretical depth of the holes is equal to the thickness of the wall of the part to be drilled and is, for example, between 1 and 10 mm, and preferably between 2 and 5 mm.

When used in drilling mode, the electrode 10 is supplied with a high current so that the spark produced between the electrode 10 and the part 16 is sufficient to destroy the material of the part and form the hole 18.

The electrode 10 may be supplied with a voltage greater than or equal to 100V and a current greater than 1 ampere. The electrode 10 may be supplied with electrical pulses having a ratio of pulse time to inter-pulse time greater than 0.2, and preferably between 0.5 and 0.8. Furthermore, the electrode can be connected to a positive or negative terminal, so it does not matter what polarity it has.

The electrode 10 has a further function of scanning or detecting the part. In this case, the electrode 10 is supplied with a lower current so that the spark produced between the electrode and the part does not damage the part, but simply allows its presence and position to be detected.

The electrode can then be supplied with a voltage of less than 100V and a current of less than 1 ampere. The electrode can be supplied with electrical pulses with a ratio of less than 0.2. Finally, the polarity of the electrode is preferably reversed with respect to the polarity of the electrode in drilling function.

FIGS. 1 and 2 show different steps of an embodiment of a method according to the invention for drilling a hole 18 in the part 16.

FIG. 1 shows several different positions of the electrode 10 and the steps of the method. These positions are identified by the numbers I to VIII.

The position I corresponds to the starting position of the electrode 10, this position corresponds to a side ZI on the axis Z. In the example shown, and generally in the rest of the description (unless otherwise stated), the side of the electrode is taken at its upper end opposite the part to be drilled.

In the position II, the electrode 10 is advanced towards the part until a first spark 20 is created, i.e. until the distance between the free end of the electrode and the surface 16a of the part is such that a spark 20 can be created between the electrode and the part. This distance is typically 10 mm. The position II corresponds to a side ZII on the axis Z.

The electrode is advanced further towards the part to drill a hole 18. It then reaches a position III which corresponds to a side ZIII on the axis Z. The sum of the sides ZII and ZIII corresponds to the downstroke required to make the hole.

This stroke is determined so that the hole is opening out, but the wear U of the electrode, which is difficult to predict with precision, may result in the hole not opening out. This stroke is for example between 5 and 20 mm, and is preferably between 10 and 15 mm. The electrode is in position III when its free end is at the side ZIV and the hole is not opening out.

The respective positions I, II, III correspond to a first step a) of the method consisting of advancing the electrode 10 towards the part to drill a hole.

A second step b) of the method consists in retracting the electrode and taking it out of the hole. The electrode is then moved to a position V located at a side ZV, located between the sides ZII and ZIII. The upper end of the electrode is at the side ZV'. Alternatively, the electrode could be moved to a position at the side ZII. However, a minimum wear of the electrode can be estimated and the machine can be set up so that the retraction of the electrode from position III to the position V takes this wear into account. This retraction must be sufficient to ensure that the electrode in the position V is not susceptible to touch the part. Since a spark was created in the position II when the electrode was at the side ZII, it is understood that the electrode, after its retraction from the position III, could be in the position II without risk of touching the part and also in the position V without risk of touching the part taking into account this minimum wear of the electrode when drilling a hole.

The optimisation of the electrode travel paths is particularly important for optimising the drilling time of the hole and the method as a whole.

The method further comprises a step c) of laterally moving the head and thus the electrode to a position VI. In the present application, lateral displacement of the head means displacement of the head in a direction perpendicular to the axis of the electrode. The electrode remains at the same side ZV. The free end of the electrode is at the side ZV'. The electrode is preferably located as close as possible to the hole that has just been made.

For example, the displacement is carried out over a distance of less than or equal to 5 mm, and preferably less than or equal to 1 mm. It can be carried out over a distance representing less than 100% of the diameter of the hole to be drilled, and preferably between 40 and 70% of this diameter.

The method then includes a step d) of advancing the electrode 10 towards the part to scan the part. The electrode is moved until a scanning spark 22 can be created, i.e. until the distance between the free end of the electrode and the surface 16a of the part is such that a spark can be created between the electrode and the part. This distance D2 is typically 5 mm. It may be different from the distance for creating the spark 20, as long as the machine parameters are different. The position VII corresponds to a side ZVII on the axis Z. The free end of the electrode is at the side ZVII'.

The electrode can then be retracted and returned to a position VIII at the side ZII.

The method comprises a subsequent step e) of calculating the effective depth of the hole drilled in step a) from the difference in the measured sides between the positions III and VII.

More precisely, the positions III and VII are used to determine a first distance (by the formula ZIV-ZV', in absolute value), which corresponds to the distance X1 covered by the free end of the electrode when the latter is moved from the position III to the position V. The positions VI and VII are used to determine a second distance (by the formula ZVIII' and ZV', in absolute value), which corresponds to the distance X2 traveled by the free end of the electrode when the latter is moved from the position VI to the position VII.

The difference in sides is a measure of the difference between the distances X1 and X2 and therefore represents the effective depth P of the drilled hole.

The method may include further steps f) and g) of comparing the calculated effective depth P with a theoretical depth, and in the event that the effective depth is less than the theoretical depth, advancing the electrode towards the part and into the hole drilled in step a) to drill it further, and preferably make it open out.

These steps are illustrated in FIG. 2.

The electrode is initially in the position VIII and is moved laterally to the position IX which is similar to the position V, i.e. it is at a side ZII taking into account the electrode wear.

The electrode 10 is advanced towards the part and into the hole so as to drill the hole further. It is in a position X at the entrance of the hole, at a side ZX, and then in a position XI, at a side ZXI at the end of the drilling, in which its free end should in principle be aligned with the internal surface 16b of the part or below this surface. The electrode has also undergone a wear U' during this additional drilling.

The stroke between the sides ZX and ZXI is determined so that the hole opens out. This stroke can be equal to the stroke between the sides ZII and ZIII.

The electrode is then retracted and removed from the hole to a position XII at the side ZX, located between the sides ZII and ZXI. As described above, a minimum wear of the electrode can be estimated and the machine can be set up so that the retraction of the electrode from the position XI to the position XII takes this wear into account. This retraction must be sufficient to ensure that the electrode in the position XII is not likely to touch the part.

The electrode can then be moved to a position XIII situated at the side ZII.

It is possible to check again whether the hole retouched after steps f) and g) opens out. This can be done by calculating the actual depth of the hole as described above and comparing it with the theoretical depth. It is therefore understood that steps c), d) and e) are repeated, and that steps f) and g) could possibly be repeated after step e) if it turns out that the hole does not open out even after a first retouching operation by steps f) and g).

The invention claimed is:

1. A method for electrical discharge drilling of a hole in a part made of electroconductive material, the method using an electrical discharge machine comprising a head that can move relative to the part and carrying a consumable EDM electrode which is of elongated shape and is moved in translation along its elongation axis, the method comprising the steps of:
   a) advancing the EDM electrode towards the part for drilling a hole in the part,
   b) retracting the EDM electrode and removing the EDM electrode from the hole,
   wherein the method further comprises the following steps:
   c) laterally moving the head over a distance representing less than 100% of the diameter of the hole to be drilled,
   d) advancing the EDM electrode towards the part for scanning the part, and
   e) calculating the effective depth of the hole drilled in step a) from a difference in the measured sides in a direction parallel to said axis, between a first position of the EDM electrode at the end of step a), and a second position of the EDM electrode in step d) when scanning the part.

2. The method of claim 1, wherein it comprises the further steps of:
   f) comparing the calculated effective depth with a theoretical depth, and
   g) in the event that the effective depth is less than the theoretical depth, advancing the EDM electrode towards the part and into the hole drilled in step a) to drill it further.

3. The method of claim 2, wherein step g) is performed so that the hole opens out.

4. The method of claim 2, wherein steps c), d) and e) are repeated after steps g), and steps f) and g) are optionally repeated after step e).

5. The method according to claim 1, wherein a first side is determined and equal to the distance travelled by the EDM electrode in said direction between its first position and a third position of the EDM electrode at the end of step b), and a second side is determined and equal to the distance travelled by the EDM electrode in said direction between that third position and the second position of the EDM electrode, the effective depth of the drilled hole being equal to the difference between the first and second sides.

6. The method according to claim 1, wherein the displacement in step c) is performed over a distance between 40 and 70% of the diameter of the hole.

7. The method according to claim 1, wherein the displacement in step c) is performed over a distance of less than or equal to 5 mm.

8. The method according to claim 7, wherein the displacement in step c) is performed over a distance of less than or equal to 1 mm.

9. The method according to claim 1, wherein in step a), the EDM electrode is supplied with a voltage greater than or equal to 100V and a current greater than 1 ampere, and in step d), the EDM electrode is supplied with a voltage less than 100V and a current less than 1 ampere.

10. The method according to claim 1, wherein in step a) the EDM electrode is supplied with electrical pulses, wherein the ratio of the time of the pulses on the time between the pulses is greater than 0.2, and in step d) the EDM electrode is supplied with electrical pulses, the aforesaid ratio of which is less than 0.2.

11. The method according to claim 10, wherein the ratio of the time of the pulses on the time between the pulses is comprises between 0.5 and 0.8.

12. The method according to claim 1, wherein in step d) the polarity of the EDM electrode is reversed with respect to the polarity of the EDM electrode in step a).

13. The method according to claim 1, wherein at the beginning of step a) and before drilling the hole, the EDM electrode is advanced towards the part to a predetermined distance suitable for creating a first spark.

14. The method according to claim 13, said predetermined distance is between a free end of the EDM electrode and a surface of the part.

15. The method according to claim 14, wherein said predetermined distance is 10 mm.

16. The method according to claim 1, wherein in step d) the EDM electrode is moved towards the part to a predetermined distance suitable for creating a scanning spark.

17. The method according to claim 16, wherein in step d) the distance is between a free end of the EDM electrode and a surface of the part.

18. The method according to claim 17, wherein said predetermined distance is 5 mm.

19. The method according to claim 1, wherein the part made of electroconductive material is a part for an aircraft turbomachine.

* * * * *